W. H. PRATT & P. C. MORGANTHALER.
ELECTRIC METER
APPLICATION FILED MAR. 12, 1914.

1,180,794.  Patented Apr. 25, 1916.

Witnesses:

Inventors:
William H. Pratt,
Peter C. Morganthaler,
by Albert G. Davis
Their Attorney.

UNITED STATES PATENT OFFICE.

WILLIAM H. PRATT, OF LYNN, MASSACHUSETTS, AND PETER C. MORGANTHALER, OF FORT WAYNE, INDIANA, ASSIGNORS TO GENERAL ELECTRIC COMPANY, A CORPORATION OF NEW YORK.

ELECTRIC METER.

1,180,794.    Specification of Letters Patent.    Patented Apr. 25, 1916.

Application filed March 12, 1914. Serial No. 824,274.

*To all whom it may concern:*

Be it known that we, WILLIAM H. PRATT, a citizen of the United States, residing at Lynn, county of Essex, State of Massachusetts, and PETER C. MORGANTHALER, a citizen of the United States, residing at Fort Wayne, county of Allen, State of Indiana, have invented certain new and useful Improvements in Electric Meters, of which the following is a specification.

Our invention relates broadly to electric meters, and more particularly to alternating current electric motor meters.

More specifically our invention relates to alternating current electric motor meters of the induction type.

The objects of our invention are to generally simplify and improve the construction of electric meters of the type to which our invention relates, and to provide a meter of high initial and sustained accuracy, of pleasing appearance, and simple construction.

A further object of our invention is to provide an improved construction of electric meter in which the operative elements are easily and conveniently accessible for inspection, repair, adjustment and testing.

Other specific objects of our invention will be noted in detail hereinafter.

The features of our invention which we consider novel and patentable are definitely pointed out in the claims appended hereto.

Figure 1:
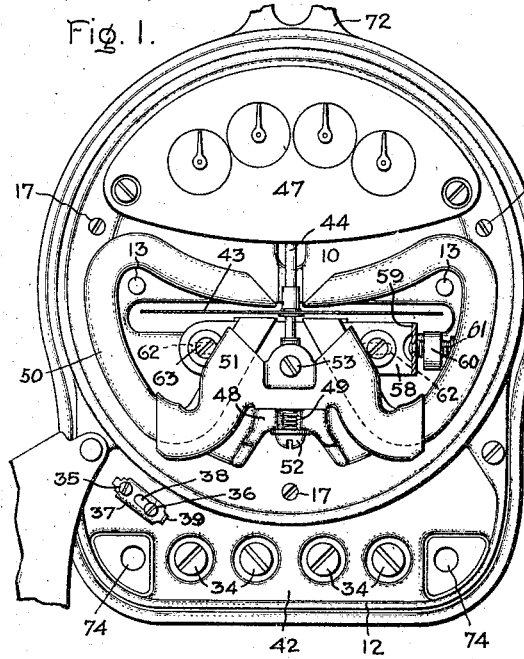
Figure 3:
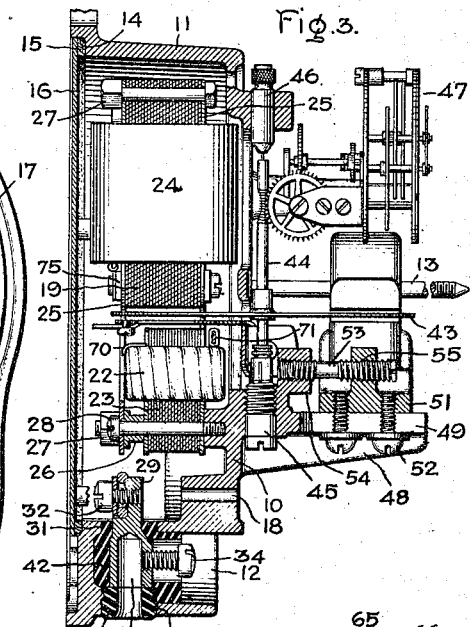
Figure 2:
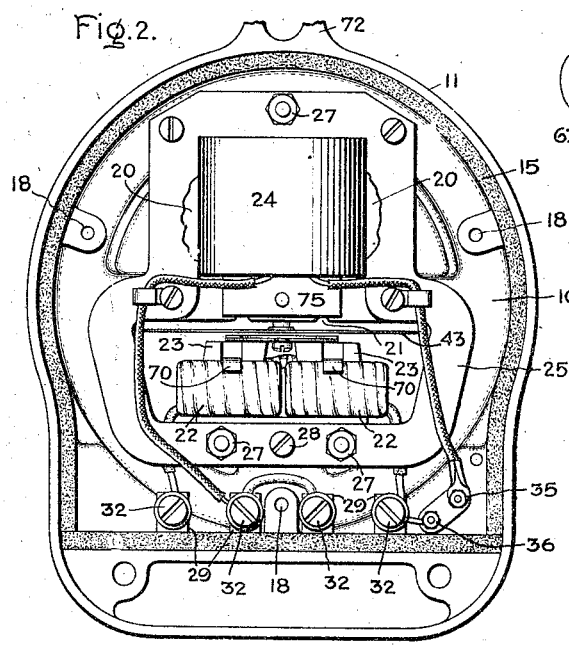
Figure 4:
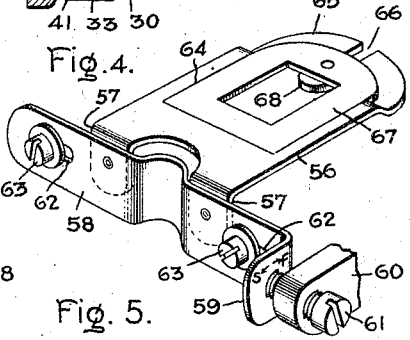
Figure 5:
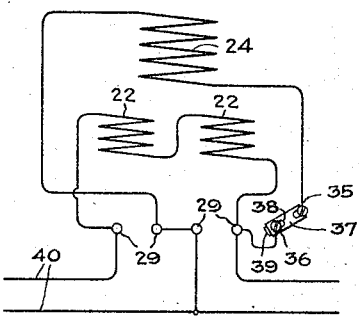

The novel features of our invention and the construction and operation of an electric meter of the induction type embodying these features will be understood from the following description taken in connection with the accompanying drawings, in which;

Figure 1 is a front elevation of the meter with the cover removed and the cover plate of the terminal chamber open; Fig. 2 is a rear elevation of the meter with the back plate removed; Fig. 3 is a sectional end elevation; Fig. 4 is a perspective view of the friction compensating and phase lagging device employed in the meter; and Fig. 5 is a diagrammatic view of the electrical connections of the meter illustrating the operation of our novel test loop.

Referring to Figs. 1, 2, and 3 of the drawings it will be seen that the operative elements of the meter are mounted on a central supporting member 10 of magnetic material. This supporting member is cast integrally with a cylindrical member 11, and these two members form a compartment inclosing the magnetic circuit and motive elements of the meter. A terminal chamber 12 is also integrally cast with the supporting and cylindrical members. Posts 13 are secured to the supporting member 10 and serve in conjunction with the usual wing nuts to secure a suitable cover to the meter. The wing nuts and cover are of the usual and well known types and for the sake of greater simplicity of the drawings have not been illustrated. The rear interior wall of the cylindrical member 11 is provided with a shoulder 14 upon which rests a gasket 15 of felt or other suitable material. A back inclosing plate 16 is adapted to be securely held against the gasket 15 and shoulder 14 by means of three bolts 17 extending through holes 18 in the supporting member 10. A key-holed supporting lug 72 of the usual type is cast integral with the cylindrical member 11. The base of the terminal chamber has two holes 74 through which supporting screws are adapted to extend, so that these screws are inside the terminal chamber and inaccessible when this chamber is sealed.

The magnetic circuit of the meter comprises two separate and independent magnetic cores. One of these cores is substantially rectangular in shape and has a center leg 19 and two outer legs 20. The end of each outer leg extends inwardly toward the center leg, and the inwardly extending portion of each outer leg is separated from the center leg by an air gap 21. A potential coil 24 is carried by the center leg 19 of this core. The second magnetic core is U-shaped, as can be seen in Fig. 2 of the drawings, and has a current or series coil 22 mounted on each of its legs 23. The outside laminations of the U-shaped core are slit to provide tongues 70 which are bent over the coils 22 to firmly hold the coils on the legs of the core, as will be clearly seen in Figs. 2 and 3 of the drawings. The coils 22 are connected in series by a conductor 71. Each of the two cores consists of a bundle of laminations of magnetic material, as illustrated in Fig. 3 of the drawings. The laminations of each core are firmly bound together between two spacing frames 25. Each spacing frame consists of a continuous strip of magnetic material of a somewhat greater thickness than the thickness of the laminated punchings of the magnetic cores. The configuration of the spacing frames is best shown in Fig. 2 of the drawings.

The spacing frames are arranged adjacent, and directly in contact with, each of the outside laminations of the rectangular shaped magnetic core. One of the spacing frames is also directly in contact with one of the outside laminations of the U-shaped magnetic core, whereby these corresponding outside laminations of the two cores lie in substantially the same plane. In order to secure the proper meter torque the U-shaped core is of lesser thickness than the rectangular shaped core, and hence spacing bushings 26 of magnetic material are placed between the other outside lamination of the U-shaped core and the other spacing frame. Bolts 27 firmly bind the laminations of each core between the two spacing frames whereby the two cores are united in a single unitary structure constituting the magnetic circuit and motive elements of the meter. This unitary structure is mounted by means of bolts 28 on the supporting member 10 within the compartment formed by the supporting member 10 and cylindrical member 11. Clamping members 75 of non-magnetic material further assist in firmly binding together the extremities of the legs of the potential core.

The spacing frames 25 serve the double function of rigidly securing the two magnetic cores in a single unitary structure and of providing a return path of low and substantially uniform reluctance for the leakage potential flux. The leakage or torque producing potential flux passes from the potential core to the series core across the air gap therebetween, and a large part of this flux returns to the potential core through the magnetic spacing frames. Where the iron of the meter casing is exclusively relied upon to form the return path for the potential leakage flux the reluctance may be undesirably high and ununiform, due to imperfections in the materials or in the construction. The use of magnetic spacing frames in accordance with our invention eliminates both of these difficulties, since the reluctance of the spacing frames is substantially uniform and relatively low. The spacing frames, accordingly, provide a return path of low and substantially uniform reluctance for the leakage potential flux, thereby increasing the torque of the meter and rendering its performance more definite.

Four main terminals 29 are arranged in the terminal chamber 12. The outside wall of the terminal chamber is provided with four holes 30, and the oppositely positioned wall of the chamber is provided with four registering holes 31. One end of each terminal 29 extends through one of the holes 31 and is provided with a binding screw 32. The other end of each terminal has a recess 33 in which an electric conductor, such as a leading-in-wire, is adapted to be firmly secured by a screw 34. The potential and series coils are adapted to be suitably connected by means of conductors and the binding screws 32 to the terminals.

Referring to Fig. 5 of the drawings it will be seen that one end of the potential coil 24 is directly connected to one of the main terminals 29. The other end of the potential coil is connected to an auxiliary terminal 35. The auxiliary terminal 35 and a coöperating auxiliary terminal 36 are arranged in the terminal chamber, as shown in Figs. 1 and 2 of the drawings. The auxiliary terminal 36 is electrically connected to one of the main terminals 29. A metallic strip or test loop 37 is arranged to connect or disconnect at will the auxiliary terminals. This strip has a slot 38 which registers with the terminal 36 and a recess adapted to register with the terminal 35 when one end of the slot 38 is moved adjacent the terminal 36, which position of the strip is illustrated in Fig. 1 of the drawings. The strip 37 has a projecting finger 39 by which it is conveniently moved.

It will be observed, by reference to Figs. 1 and 5 of the drawings, that by moving the test loop 37 and disconnecting the auxiliary terminals 35 and 36 the potential coil is electrically cut out of circuit with the mains 40 and also disconnected from the series coils. This is a particularly advantageous feature in testing the meter. For example, where a number of meters are being tested in series the potential coils are disconnected by means of the test loop 37, and then the potential coil of each meter is connected to the standard voltage, thus eliminating the error occasioned by the voltage drops in the various meters. Again, where an installed meter is to be tested, the potential coil can be electrically disconnected from the series coils by means of the test loop, and then connected by means of one main terminal 29 and the auxiliary terminal 35 directly across the main line conductors. A load box, comprising a transformer with a low voltage secondary of well known construction, can then be employed to furnish the testing current to the series coils of the meter, thus avoiding the necessity of using line voltage and regulating resistances for supplying the testing current to the current coils.

Bushings 41 of insulating material are arranged in the openings 30 of the terminal chamber and have holes which register with the recesses 33 of the terminals. The main terminals and the auxiliary terminals are firmly embedded in a mass of insulating material 42 which is molded in position in the terminal chamber. The insulating material may consist of any of the well known insulating compounds which are adapted for molding and which form a rigid solid mass upon hardening. By molding the insulating material in the terminal chamber a substantially integral structure is obtained, since the insulating material when solidified adhesively adheres to the walls of the chamber, to the main and auxiliary terminals, and to the bushings 41. The terminals are thus firmly and securely embedded in the molded insulating material, and neither they nor the insulating material can be removed from the chamber except by disintegrating the insulating material.

A disk armature 43 of aluminum or other suitable material is secured to a rotatably mounted shaft 44. The shaft 44 has a lower step bearing 45 operatively mounted on the supporting member 10 and an upper bearing 46 also mounted on the supporting member. The shaft 44 is operatively geared to a meter register 47. The construction of the meter register and gearing operatively connecting it to the meter shaft constitute no part of our present invention, but these features are described in detail and claimed in the application for patent of Alexander J. R. Fiego, Serial No. 825,998, filed March 20, 1914.

A bracket 48 extends from and is integral with the supporting member 10. The bracket has a centrally extending slot 49. The rotation of the armature is adapted to be damped or retarded by two permanent magnets 50, which are rigidly secured together by a yoke 51 of non-magnetic material. The yoke is adjustably mounted on the bracket 48, and is adapted to be secured in its adjusted position by means of set-screws 52 extending through the slot 49 and engaging suitable screw-threaded holes in the yoke. The damping magnets are provided with a micrometer adjusting attachment comprising a right hand and left hand screw-threaded bolt 53 which when turned moves the magnets and yoke bodily with respect to the disk armature. One of the screw-threaded ends of the bolt 53 operatively engages a screw-threaded hole in a lug 54 preferably integral with the supporting plate 10. The other end of the bolt 53 has an oppositely pitched screw-thread which engages a screw-threaded hole 55 of the yoke 51. By a suitable selection of the pitch of the screw-threads on the bolt 53 an adjustment of any desired degree can be obtained.

A friction compensating plate for obtaining the light load adjustment of the meter extends in the air gap between the two magnetic cores and parallel to the disk armature. The plate has bent lugs 57 secured to an attaching member 58. The attaching member has a bent lug 59. An adjusting bolt 61 passes through a screw-threaded hole in a boss 60 integrally attached to the supporting plate 10, and is secured at its inner end to the lug 59, as shown in Fig. 1 of the drawings. The adjusting bolt thus serves as a means for adjusting the position of the combined friction compensating and phase lagging device with respect to the poles of the magnetic cores. The attaching plate is provided with slots 62, through which extend set-screws 63, the latter engaging in screw-threaded holes in the supporting member 10 and serving to rigidly secure the friction compensating plate in its adjusted position.

The friction compensating plate 56 is provided with a substantially rectangular hole 64. A portion of the plate 65, on one side of the hole 64 is offset. This offset portion 65 is provided with a slot 66 extending in a short distance from the outside edge. A substantially rectangular phase-lagging plate 67 is positioned in the hole 64 and is provided with a set screw 68 which extends through the slot 66, whereby the position of the plate 67 can be adjusted with respect to the plate 56 and the two plates secured together in the adjusted position. The offset of the portion 65 is such that the surfaces of the friction compensating plate 56 and phase lagging plate 67 lie in substantially the same planes, as will be best seen in Fig. 4 of the drawings. The phase lagging plate is so adjusted that the desired phase lag of 90 degrees between the series and potential fluxes is obtained, as will be understood by those skilled in the art.

The friction compensating plate is preferably constructed of German silver, brass or similar metallic material, while the phase lagging plate is preferably constructed of a metallic material having a higher specific conductivity than the material of the friction compensating plate, as for example, copper or aluminum. The resistance of the lag plate is thus lower than that of the friction compensating plate and a sufficient range of lag adjustment is thereby insured. The friction compensating plate of course produces a certain phase lag, but it is desirable to produce the greater part of the phase lag by the phase lagging plate and this is accomplished by making the resistance of the phase lagging plate lower than that of the friction compensating plate. It will be obvious that the desired difference in resistance of the two plates may be secured by properly proportioning the dimensions of the two plates and thus the two plates may be constructed of the same metallic material. The construction of the plates of dissimilar metallic materials of different specific resistances together with proper proportioning of the dimensions of the plates affords, however, a more satisfactory and convenient means for securing the proper friction compensation and phase lag adjustment.

The mounting of the phase lagging plate on the friction compensating plate results in a single unitary structure which is convenient of access, easily adjusted, and occupies little space in the air gap between the magnetic cores. The adjusting bolt 61 is very conveniently positioned in front of the supporting member 10, and is readily accessible when the cover of the meter is removed, as illustrated in Fig. 1 of the drawings. Legends S and F are stamped on the lug 59 to indicate the proper direction to turn the adjusting bolt 61 to produce a slower or faster light-load rotation of the disk armature. It will be obvious that the phase lagging plate need not necessarily be adjustable, since it is possible to so design and mount this plate that its resistance and position with respect to the friction compensating plate produce the desired phase lag.

The theory and method of operation of our improved construction of meter will be readily understood by those skilled in the art. It will be observed that we have provided a compact induction meter in which the operative elements are easily accessible and conveniently removable for inspection and repair. All necessary adjustments can be made without difficulty and with a minimum disassembling of the meter. The number of parts in the meter is few and these are secured to a central supporting member, wherefore there is less difficulty involved in securing proper alinement of the parts, and less danger that the meter will get out of alinement during transportation. The embedding of the terminals in a molded insulating compound is a decided improvement in electric meters. The terminals are thereby rigidly and permanently positioned in the chamber, and the only way in which they can be removed from the chamber is by chipping out or disintegrating the insulating compound.

While various features of our invention are herein described in connection with an induction meter, it will be evident to those skilled in the art that the practical applications of these features are in no way limited or restricted to this particular type of electric meter. Numerous modifications and changes in the details of construction and in the application of our invention to various types of electric meters will be apparent to those skilled in the art. We do not, therefore, wish to limit our invention to the specific application or details of construction herein illustrated and described by way of example, but we aim in the appended claims to cover all applications and modifications of the features of our invention within the spirit and scope thereof.

What we claim as new and desire to secure by Letters Patent of the United States, is:—

1. In an alternating current motor meter, a core of magnetic laminations, a second and independent core of magnetic laminations, and two frames of magnetic material rigidly united with said two cores in a single unitary structure and forming a path for lines of magnetic force from one core to the other core.

2. In an alternating current motor meter, a core of magnetic laminations, a second and independent core of magnetic laminations, and two frames of magnetic material between which the laminations of each core are firmly bound together, said frames serving to unite the two cores in a single unitary structure constituting the magnetic circuit of the meter.

3. In an alternating current motor meter, a core of magnetic laminations, a second and independent core of magnetic laminations, a frame of magnetic material in magnetic connection with the outer laminations on each side of both cores and forming a path for lines of magnetic force from one core to the other core, and means rigidly securing said cores and frames together to form a single unitary structure constituting the magnetic circuit of the meter.

4. In an alternating current motor meter, a core of magnetic laminations, a second and independent core of magnetic laminations, and two parallel frames each comprising a continuous strip of magnetic material between which the laminations of each core are firmly bound together, said frames thus serving to unite the two cores in a single unitary structure constituting the magnetic circuit of the meter.

5. In an alternating current motor meter, a core of laminated magnetic material, a potential coil in operative relation to said core, a second core of laminated magnetic material, a current coil in operative relation to said second core, and frames of magnetic material between which the laminations of each core are mechanically bound together thereby uniting the two cores in a single unitary structure constituting the magnetic circuit and motive elements of the meter.

6. In an alternating current motor meter, a core of laminated magnetic material, a potential coil in operative relation to said core, a second core of laminated magnetic material, a current coil in operative relation to said second core, and two parallel frames each comprising a continuous strip of magnetic material between which the laminations of each core are firmly bound together thereby forming a rigid unitary structure constituting the magnetic circuit and motive elements of the meter.

7. In an alternating current motor meter, a core of laminated magnetic material having a center leg and two outer legs separated at their ends from the center leg by air gaps, a potential coil on the center leg, a second and independent core of laminated magnetic material having two legs positioned opposite said air gaps, a current coil on each of the legs of the second core, and frames of magnetic material rigidly united with said two cores in a unitary structure and forming a path for lines of magnetic force from one core to the other core.

8. In an alternating current motor meter, a substantially rectangular core of laminated magnetic material having a center leg and two outer legs separated at their ends from the center leg by air gaps, a potential coil on the center leg of said core, a U-shaped core of laminated magnetic material having its two legs positioned substantially opposite said air gaps, a current coil on each leg of said U-shaped core, frames of magnetic material adjacent the outer laminations of each core, and means rigidly securing the laminations of the cores between said spacing frames thereby forming a unitary structure constituting the magnetic circuit and motive elements of the meter.

9. In an alternating current motor meter, a core of magnetic laminations, a second and independent core of magnetic laminations, a frame of magnetic material in contact with the outer laminations on one side of both cores and forming a path for lines of magnetic force from one core to the other core, and means rigidly securing said cores and said frame together to form a single unitary structure constituting the magnetic circuit of the meter.

10. In an electric motor meter, a supporting member, a rotatably mounted disk armature, a bracket extending from said member and integral therewith, a pair of permanent magnets, a yoke of non-magnetic material rigidly securing said magnets together and adapted to be mounted on said bracket whereby said magnets are positioned to retard the rotation of said disk armature, a bolt operatively engaging said yoke and said member and adapted when turned to adjust the position of said magnets with respect to said disk armature, and means for securing said yoke to said bracket.

11. In an electric motor meter, a supporting member, a disk armature rotatably mounted thereon, a bracket extending from said member and having a slot therein, a pair of permanent magnets, a yoke of non-magnetic material rigidly securing said magnets together, said yoke having a screw-threaded hole adapted to register with said slot whereby said magnets are positioned to retard the rotation of said disk armature, a bolt operatively engaging said yoke and said member and adapted when turned to adjust the position of said magnets with respect to said disk armature, and a set-screw extending through the slot in said bracket and engaging the screw-threaded hole in said yoke and adapted to secure the yoke and magnets in adjusted position.

12. In an alternating current motor meter, a supporting member of magnetic material, a disk armature extending through said member and rotatably supported thereby, motive elements mounted on one side of said member and positioned to exert a turning torque on said disk armature, a bracket extending from the other side of said member and integral therewith, a pair of permanent magnets, a yoke of non-magnetic material rigidly securing said magnets together and adapted to be mounted on said bracket whereby said magnets are positioned to retard the rotation of said disk armature, a lug integral with said member, a bolt operatively related to said lug and to said yoke and adapted when turned to adjust the position of said magnets with respect to said disk armature, and means for securing said yoke to said bracket.

13. In an electric motor meter, a rotatable disk armature, a pair of permanent magnets adapted to retard the rotation of the armature, a yoke of non-magnetic material rigidly securing said magnets together, a fixed bracket upon which said yoke and magnets are adapted to be mounted, and a bolt having a screw-thread at one end operatively engaging a fixed part of the meter and an oppositely pitched screw-thread at the other end operatively engaging said yoke whereby the position of said magnets with respect to said armature can be adjusted by turning said bolt.

14. In an alternating current motor meter, a supporting member of magnetic material, a disk armature extending through said member and rotatably supported thereby, motive elements mounted on one side of said member and positioned to exert a turning torque on said armature, a bracket integral with and extending from the other side of said member and having a slot therein, a pair of permanent magnets, a yoke of non-magnetic material rigidly securing said magnets together and having two screw-threaded holes therein, said yoke being mounted on said brackets so that one of said screw-threaded holes registers with said slot and so that the magnets are positioned to retard the rotation of said armature, a lug integral with said member and having a screw-threaded hole therein, a bolt having a screw-thread at one end engaging in the screw-threaded hole of said lug and an oppositely pitched screw-thread at the other end engaging in the other screw-threaded hole of said yoke whereby the turning of said bolt serves to adjust the position of said magnets with respect to said armature, and a set screw extending through said slot and engaging the registering screw-threaded hole of said yoke and adapted to secure the yoke and magnets in their adjusted positions.

15. In an alternating current motor meter, a substantially rectangular core of laminated magnetic material having a center leg and two outer legs separated at their ends from the center leg by air gaps, a potential coil carried by said center leg, a U-shaped core of laminated magnetic material being of lesser thickness than that of the rectangular core and having its two legs positioned substantially opposite said air gaps, a current coil on each leg of said U-shaped core, a frame of magnetic material adjacent the outer laminations on one side of each of said cores and positioned so that such outer laminations are in substantially the same plane, a second frame of magnetic material adjacent the other outer lamination of said rectangular shaped core, spacing means of magnetic material between said second frame and the other outer lamination of the U-shaped core, and means rigidly securing the laminations of each core between said frames.

16. In an alternating current motor meter, a core of laminated magnetic material, a second core of laminated magnetic material, a magnetic frame comprising a continuous strip of magnetic material, and means rigidly securing said cores and said frame together as a single unitary structure constituting the magnetic circuit of the meter whereby said frame forms a path for lines of magnetic force from one core to the other core.

In witness whereof I, the said WILLIAM H. PRATT, have hereunto set my hand this 5th day of March, 1914, and I, the said PETER C. MORGANTHALER, have hereunto set my hand this 9th day of March, 1914.

WILLIAM H. PRATT.
PETER C. MORGANTHALER.

Witnesses to Pratt:
JOHN A. MCMANUS, Jr.,
ROBERT SHAND.

Witnesses to Morganthaler:
R. R. ENOCH,
D. W. CRISE.